United States Patent Office 3,285,841
Patented Nov. 15, 1966

3,285,841
ZINC CATHODE STRIPPINGS
Thomas I. Moore, Webster Groves, and Robert K. Carpenter, Arnold, Mo., assignors to American Zinc, Lead & Smelting Company, St. Louis, Mo., a corporation of Maine
No Drawing. Original application Nov. 13, 1961, Ser. No. 152,035, now Patent No. 3,245,779, dated Apr. 12, 1966. Divided and this application Aug. 30, 1965, Ser. No. 483,816
The portion of the term of the patent subsequent to Apr. 12, 1983, has been disclaimed
1 Claim. (Cl. 204—115)

This application is a division of my prior co-pending application Serial No. 152,035, filed November 13, 1961, now Patent No. 3,245,779.

The present invention is directed generally to the melting of electrolytically deposited metal, such as zinc, and particularly to the pretreatment of cathode deposits from electro-winning processes so as to expedite and facilitate their melting in a furnace.

It has long been the practice to take cathode zinc deposits from an electrolytic zinc cell and charge them into an appropriate furnace for melting. However, in this process, there is formed a "wet" (in which a large amount of metal is entrained) mushy dross which also floats on the surface of the molten metal bath. In current practices this "wet" mushy dross is "liquated" by raking a flux into the molten metal bath, and when reasonably "dry," the dross is removed from the furnace. Although the application of the flux liquates the dross substantially, it is still quite "wet," so that to recover further entrained metal the dross is usually charged to "dross drums" for further treatment with fluxes and the separated metal is returned to the melting furnace. Even after the "dross drum" treatment, the "liquated" dross will assay about 86 percent zinc, 30 percent being metal which may be recovered by other procedures. The remainder of the dross is oxides and the like. Assuming the cathode deposits to be 100 percent zinc, the melting efficiency achieved, even after dross drying, is only about 93 percent.

In all of the heretofore known processes, the cathode deposits have the tendency to float on the surface of the molten metal bath, thereby decreasing the melting efficiency of the furnace.

There are numerous fluxes used to accelerate the liquation process. One of the preferred and most widely used fluxes is ammonium chloride.

Kerschbaum, United States Patent No. 1,913,929, uses ammonium chloride to regenerate a molten chloride bath which is used in melting and refining crude zinc.

Handwerk et al., 2,457,553, teaches a process wherein finely divided zinc particles are passed through a spray of molten zinc. It is stated therein that where heavy oxidation is present on the zinc, ammonium chloride, salammoniac, may be used as a flux.

Knechtel, 2,636,817, uses ammonium chloride as a flux in the melting furnace to liquate the dross which is naturally formed on the surface of molten zinc. Knechtel, however, goes through an extensive preheating treatment of the zinc prior to melting the zinc in the presence of a flux. The preheating treatment is carried on at temperatures within the range of 275–370° C. (527–698° F.)

It is therefore an object of the present invention to provide a process for the melting of zinc with a high degree of efficiency and producing a "dry" dross without the use of subsequent dross liquating apparatus.

Other objects will appear obvious to those skilled in the art from the following detailed description which describes the present invention in such full, clear and exact terms that any person skilled in the art will be able to use the same.

Generally speaking, the present invention comprises realized substantially instantaneously. The dross formation pretreating the zinc cathode deposits with a flux to form a thin coating thereon and subsequently charging the coated cathode deposit into a melting furnace. Pretreated cathode deposits are charged into the melting furnace in such manner that they submerge below the metal line immediately and do not float on the surface of the bath. Thus, the cathode is subjected to the super heat of the metal bath and it is believed that cathode melting is realized subsequently instantaneously. The dross formation which results from this procedure is a dry non-mushy type dross, similar to that recovered from dross drums.

This process provides numerous advantages over the processes now in practice. The recovery of zinc in the metal bath, from the cathode deposits, is increased to equal or exceed that obtained after conventional practice including dross drum treatment. The use of dross drums may be eliminated since the dross removed from the furnace is equally as dry as that obtained from the conventional dross drums. The size of the furnace necessary to melt a given tonnage is greatly reduced in both volume and surface area required. The formation of dried dross on the metal bath eliminates the necessity for working in ammonium chloride to break down the metallic mush, thus saving time and labor. When subjecting the wet dross to dross drum treatment, there occurs a slight iron contamination, which is avoided by the elimination of the dross drum treatment.

The following example is illustrative of the method of the present invention, but the invention is not intended to be limited thereby.

*Example*

A 2,836 pound charge of stripped electrolytically deposited zinc was dipped in a 25 percent ammonium chloride-water solution. The charge was allowed to remain in the solution for approximately one minute, removed therefrom and dried. This pretreatment resulted in a surface treatment of cathode deposits forming a thin coating of ammonium chloride thereon equal to about four pounds per ton of the zinc cathode.

The cathode deposits were charged to an induction furnace by means of a chute set at an angle of about 70 degrees. The treated deposits disappeared immediately beneath the surface of the molten bath. The temperature of a metal bath was maintained at about 850° F. The dross which rose to the surface of the molten bath was dry and could be easily removed. The removed dross weighed 108 pounds equaling 3.77 percent of the cathode deposit charge weight. This dross analyzed 86.6 percent zinc.

Assuming the cathode deposits to be 100 percent zinc, the melting efficiency of the furnace can be calculated according to the following formula:

$$100 - \frac{D \times A}{C} = \text{Melting efficiency}$$

wherein:

D is the dross weight (108 pounds)
A is the dross assay (86.6%)
C charge weight (2,836)

In other words, subjecting the figures from the above example in this formula, the melting efficiency of the present process equals about 96.71%.

There are numerous ways that the pretreatment procedure may be carried out. Namely, a conveyor system may be set up whereby the zinc deposits are placed on the conveyor which continuously runs through the flux solution, then through a drying stage and thereafter charged into the melting furnace. Also the pretreatment can be accomplished by spraying the zinc deposits with the flux solution. Similarly, the deposits may be dipped into a molten flux bath instead of being subjected to the dilute flux solutions. The concentration of the water solution should be such that a range from at least about two to five pounds of the flux will remain on the zinc per ton of zinc cathode deposit. The concentration of the flux is dependent primarily upon the condition of the cathodes. The concentration varies inversely with the quality of the cathode, thus if the cathodes are of a firm, smooth deposit, it is only necessary to use a small amount of flux.

Either the reverberatory or induction type furnace may be used to melt the pretreated zinc cathode deposits, however, from the efficiency standpoint, the induction type furnace is preferred.

Although the only specific embodiment showed the use of ammonium chloride as the flux, the present invention is not to be construed as limited thereto since any zinc flux material is applicable that can be put into solution like the ammonium chloride. Inclusive in this category are such fluxes as zinc chloride, zinc ammonium chloride, and sodium chloride. Also fluoride salts of zinc and sodium may also be mixed with the zinc, sodium and ammonium chloride fluxes. The expression "zinc flux material" as used herein is intended to embrace any material that has the property of fluxing zinc, irrespective of whether the form of the material is a solution, suspension or melt.

The cathode deposits are charged to the melting furnace one by one and in such a manner that they enter the bath in a vertical or slightly inclined position resulting in immediate submersion of the cathode deposit. By immediate submersion of the deposit, they are subjected to the "super" heats present within the molten bath which, it is believed, melts the cathode deposits substantially instantaneously. The temperature of the furnace is maintained within the range of 825 to 875° F., and in the case of an induction type furnace, the temperature is maintained quite uniform by the circulation of the metal from the inductors.

Many changes in and modification to the process of the present invention may be made without departing from the spirit of the invention or sacrificing any of its advantages.

Having thus described the invention, what is claimed and desired to be secured by Letters Patent is:

Solid zinc cathode strippings having a dry coating of solid zinc flux material.

References Cited by the Examiner
UNITED STATES PATENTS

| | | | |
|---|---|---|---|
| 363,593 | 5/1887 | Clamer | 117—51 |
| 445,650 | 2/1891 | Kindermann | 117—127 |
| 1,381,085 | 6/1921 | Dantsizer | 117—51 |
| 1,550,192 | 8/1925 | Wild et al. | 75—65 X |
| 1,913,929 | 6/1933 | Kerschbaum | 75—65 X |
| 2,243,784 | 5/1941 | Udy | 75—65 |
| 2,312,109 | 2/1943 | McDonald et al. | 117—202 |
| 2,457,553 | 12/1948 | Handwerk et al. | 75—86 |
| 2,701,194 | 2/1955 | Deterding | 75—86 X |
| 2,824,021 | 2/1958 | Cook et al. | 117—51 |
| 3,030,242 | 4/1962 | Gieselman et al. | 117—127 |

OTHER REFERENCES

Liddell: Handbook of Non-Ferrous Metallurgy, vol. 2, McGraw-Hill, New York, 1926, pages 1139 and 1140.

HYLAND BIZOT, *Primary Examiner.*

DAVID L. RECK, *Examiner.*

H. W. TARRING, *Assistant Examiner.*

UNITED STATES PATENT OFFICE
CERTIFICATE OF CORRECTION

Patent No. 3,285,841　　　　　　　　　　　　　　November 15, 1966

Thomas I. Moore et al.

It is hereby certified that error appears in the above numbered patent requiring correction and that the said Letters Patent should read as corrected below.

Column 2, line 2, strike out "realized substantially instantaneously. The dross forma-"; line 11, for "subsequently" read -- substantially --.

Signed and sealed this 12th day of September 1967.

(SEAL)
Attest:

ERNEST W. SWIDER　　　　　　　　　　　　　　EDWARD J. BRENNER
Attesting Officer　　　　　　　　　　　　　　Commissioner of Patents